(12) United States Patent
Neumann et al.

(10) Patent No.: US 11,218,298 B2
(45) Date of Patent: Jan. 4, 2022

(54) SECURED COMMUNICATION BETWEEN A HOST DEVICE AND A CLIENT DEVICE

(71) Applicant: Ademco Inc., Golden Valley, MN (US)

(72) Inventors: William Neumann, Robbinsdale, MN (US); Colin Hanson, Wayzata, MN (US)

(73) Assignee: Ademco Inc., Golden Valley, MN (US)

( * ) Notice: Subject to any disclaimer, the term of this patent is extended or adjusted under 35 U.S.C. 154(b) by 596 days.

(21) Appl. No.: 16/158,161

(22) Filed: Oct. 11, 2018

(65) Prior Publication Data

US 2020/0119912 A1    Apr. 16, 2020

(51) Int. Cl.
*H04L 9/08*      (2006.01)
*H04L 29/06*     (2006.01)
*H04L 9/30*      (2006.01)
*H04L 9/32*      (2006.01)

(52) U.S. Cl.
CPC .......... *H04L 9/0833* (2013.01); *H04L 9/3073* (2013.01); *H04L 9/3263* (2013.01); *H04L 63/0478* (2013.01); *H04L 63/0823* (2013.01); *H04L 63/065* (2013.01)

(58) Field of Classification Search
CPC ... H04L 9/0833; H04L 9/3073; H04L 9/3263; H04L 63/0478; H04L 63/0823; H04L 63/065; H04L 9/0891; H04L 9/0844; H04L 63/0428; H04L 9/3066; H04W 12/00305; H04W 12/009; H04W 12/0401; H04W 4/70; H04W 4/33
See application file for complete search history.

(56) References Cited

U.S. PATENT DOCUMENTS

| | | | | |
|---|---|---|---|---|
| 6,772,331 | B1* | 8/2004 | Hind | H04W 12/50 |
| | | | | 713/151 |
| 6,801,998 | B1* | 10/2004 | Hanna | H04L 63/045 |
| | | | | 713/155 |
| 7,234,059 | B1 | 6/2007 | Beaver et al. | |
| 8,160,246 | B2 | 4/2012 | Kim et al. | |
| 8,214,890 | B2 | 7/2012 | Kirovski et al. | |
| 8,245,047 | B2 | 8/2012 | Zaccone et al. | |
| 8,356,181 | B2 | 1/2013 | Brickell et al. | |
| 8,555,063 | B2 | 10/2013 | Xiao et al. | |
| 8,595,505 | B2 | 11/2013 | Brickell et al. | |

(Continued)

OTHER PUBLICATIONS

Kai Ren, Mar. 29, 2016, "Bluetooth Pairing Part 1 Pairing Feature Exchange", https://www.bluetooth.com/blog/bluetooth-pairing-part-1-pairing-feature-exchange/.*

(Continued)

*Primary Examiner* — Shanto Abedin
(74) *Attorney, Agent, or Firm* — Fredrikson & Byron, P.A.

(57) ABSTRACT

A method for a host to establish communication with a client comprising receiving a client-specific certificate and a pairing request message, verifying the client-specific certificate, verifying the pairing request message, sending a host-specific certificate and a first value, receiving a second value, verifying the second value; sending a third value, receiving an encrypted fourth value, decrypting the fourth value using a group key, determining the fourth value equals the third value, identifying the client received the group key correctly, and ending a verification message indicating successful establishment of communication.

18 Claims, 6 Drawing Sheets

(56) References Cited

U.S. PATENT DOCUMENTS

| | | | |
|---|---|---|---|
| 8,850,031 | B2 | 9/2014 | Oshiba |
| 10,742,643 | B2 | 8/2020 | Moore |
| 2013/0054964 | A1* | 2/2013 | Messerges ............ H04L 9/0833 |
| | | | 713/163 |
| 2015/0222604 | A1 | 8/2015 | Ylonen |
| 2016/0065362 | A1 | 3/2016 | Choyi et al. |
| 2016/0066354 | A1 | 3/2016 | Oba et al. |
| 2016/0224799 | A1* | 8/2016 | Uzun .................. G06F 21/6227 |
| 2017/0111357 | A1* | 4/2017 | Unagami .............. H04L 9/3263 |
| 2017/0126404 | A1* | 5/2017 | Unagami .............. H04L 9/0637 |
| 2017/0134942 | A1 | 5/2017 | Morchon et al. |
| 2018/0278625 | A1 | 9/2018 | Cammarota et al. |
| 2019/0387401 | A1* | 12/2019 | Liao .................... H04W 12/082 |

OTHER PUBLICATIONS

FIPS PUB 186-4 Digital Signature Standard (DSS) Information Technology Laboratory National Institute of Standards and Technology Gaithersburg, MD 20899-8900 Issued Jul. 2013, p. 9, 15-19 https://nvlpubs.nist.gov/nistpubs/FIPS/NIST.FIPS.186-4.pdf.*

Notice of Intent to Grant and Text Intended to Grant from counterpart European Application No. 19202606.0, dated Dec. 11, 2020, 114 pp.

Response to Rule 69 EPC dated Apr. 20, 2020, from counterpart European Application No. 19202606.0, filed Oct. 15, 2020, 97 pp.

Islam et al., "Design of improved password authentication and update scheme based on elliptic curve cryptography," Elsevier: Mathematical and Computer Modelling, pp. 2703-2717, 2011.

Extended Search Report from counterpart European Application No. 19202606.0, dated Feb. 12, 2020, 9 pp.

He et al., "An Accountable, Privacy-Preserving, and Efficient Authentication Framework for Wireless Access Networks," IEEE Transactions on Vehicular Technology, vol. 65, No. 3, Mar. 2016, 10 pp.

Salam et al., "A trust framework based smart aggregation for machine type communication," Science China, vol. 60, Oct. 2017, 15 pp.

Cho et al., "Modeling and analysis of trust management with trust chain optimization in mobile ad hoc networks," Journal of Network Computer Applications, accepted Mar. 9, 2011, 12 pp.

Aparna et al., "Key Management Scheme for Multiple Simultaneous Secure Group Communication," International Conference on Internet Multimedia Services Architecture and Applications, IEEE, Dec. 9-11, 2009, 6 pp.

Cho et al., "A Survey on Trust Management for Mobile Ad Hoc Networks," IEEE Communications Surveys & Tutorials, vol. 13, No. 4, published Oct. 14, 2010, issued Fourth Quarter of 2011, 22 pp.

* cited by examiner

SECURED COMMUNICATION BETWEEN A HOST DEVICE AND A CLIENT DEVICE

TECHNICAL FIELD

The disclosure pertains generally to communication between devices, and more particularly to establishing secure cryptographic communication between devices.

BACKGROUND

A growing number of products/devices may use custom or proprietary wireless communication protocols for command, control, and general data transfer. This trend may accelerate with the rapid introduction of Internet of Thing (IoT) devices/systems. As such, securing point-to-point (PTP) wireless links may be an issue that should be addressed, including for low-cost embedded devices. Moreover, point-to-multipoint (P2MP) schemes do not necessarily have a lightweight, industry-standard method to perform group key establishment to enable secure wireless communication amongst a group of devices/members. Additionally, current published group key establishment methods may rely upon very high resource demands (e.g., bandwidth, processing) where growth is based on the square of number of members in the group. Furthermore, as each new member is added to the group, the heavyweight information exchanged should be repeated with all group members participating. This approach may be particularly problematic in battery powered, unlicensed, embedded devices, since these devices are often severely power, cost, and spectrum constrained. What would be desirable is a novel approach to the group key establishment process, in which these constraints are carefully considered and that provides increased security of group-based wireless communication of both legacy and new products/devices/designs, while having minimal impact to unit cost or existing, well-established installation procedures. As such, this approach may enable devices to remain price competitive while communicating securely with negligible impact to user experience.

SUMMARY

In an example of the disclosure, an approach for a host to establish communication with a client may comprise receiving a client-specific certificate and a pairing request message from the client, verifying the client-specific certificate, verifying the pairing request message in response to the client specific certificate being a valid certificate, sending a host-specific certificate and a first value to the client, receiving a second value from the client, verifying the second value, sending a third value to the client in response to the second value being valid, receiving an encrypted fourth value from the client, decrypting the fourth value using a group key, determining the fourth value equals the third value, identifying the client that received the group key correctly based on the fourth value equaling the third value, and sending a verification message to the client indicating successful establishment of communication in response to identifying that the client received the group key correctly.

Alternatively or additionally to the foregoing, the method may further comprise generating the first value in response to a signature on the pairing request message being valid, and signing the first value with a private key.

Alternatively or additionally to any of the embodiments above, the method may further comprise computing the third value and deriving a temporary key in response to the second value being valid.

Alternatively or additionally to any of the embodiments above, the method may further comprise encrypting a first and second nonce, the group key, and an encryption key using the temporary key, and sending the encrypted first and second nonce, the group key, and the encryption key to the client.

Alternatively or additionally to any of the embodiments above, the method may further comprise generating the group key for a current group period and the encryption key for updating the group key.

Alternatively or additionally to any of the embodiments above, the verification message may include at least one nonce to verify that the verification message is valid.

Alternatively or additionally to any of the embodiments above, the method may further comprise using the group key to communicate with the client.

In another example of the disclosure, a controller for establishing communication with a plurality of clients, wherein for each client of the plurality of clients the controller may be configured to receive a client-specific certificate and a pairing request message from the client, verify the client specific certificate, verify the pairing request message in response to the client specific certificate being a valid certificate, send a host-specific certificate and a first value to the client, receive a second value from the client, verify the second value, send a third value to the client in response to the second value being valid, receive an encrypted fourth value from the client, decrypt the fourth value using a group key, determine the fourth value equals the third value, identify the client received the group key correctly based on the fourth value equaling the third value, and send a verification message to the client indicating successful establishment of communication in response to identifying that the client received the group key correctly.

Alternatively or additionally to any of the embodiments above, the controller may further be configured to generate the first value in response to a signature on the pairing request message being valid, and sign the first value with a private key.

Alternatively or additionally to any of the embodiments above, the controller may further be configured to compute the third value and derive a temporary key in response to the second value being valid.

Alternatively or additionally to any of the embodiments above, the controller may further be configured to encrypt a first and second nonce, the group key, and an encryption key using the temporary key, and send the encrypted first and second nonce, the group key, and the encryption key to the client.

Alternatively or additionally to any of the embodiments above, the controller may further be configured to generate the group key for a current group period and the encryption key for updating the group key.

Alternatively or additionally to any of the embodiments above, the verification message may include at least one nonce to verify that the verification message is valid.

Alternatively or additionally to any of the embodiments above, the controller may further be configured to use the group key to communicate with the client.

In another example of the disclosure, a system for establishing communication with a plurality of clients may comprise one or more clients each having a client-specific certificate and a pairing request message and a host operatively coupled to the one or more clients. The host may be configured to receive the client-specific certificate and the pairing request message from the one or more clients, verify the client-specific certificate, verify the pairing request message in response to the client-specific certificate being a valid certificate, send a host-specific certificate and a first value to the one or more clients, receive a second value from the one or more clients, verify the second value, send a third value to the one or more clients in response to the second value being valid, receive an encrypted fourth value from the one or more clients, decrypt the fourth value using a group key, determine that the fourth value equals the third value, identify the one or more clients received the group key correctly based on the fourth value equaling the third value, and send a verification message to the one or more clients indicating successful establishment of communication in response to identifying that the one or more clients received the group key correctly.

Alternatively or additionally to any of the embodiments above, the host may further be configured to generate the first value in response to a signature on the pairing request message being valid, and signing the first value with a private key.

Alternatively or additionally to any of the embodiments above, the host may further be configured to compute the third value and derive a temporary key in response to the second value being valid.

Alternatively or additionally to any of the embodiments above, the host may further be configured to encrypt a first and second nonce, the group key, and an encryption key using the temporary key, and send the encrypted first and second nonce, the group key, and the encryption key to the client.

Alternatively or additionally to any of the embodiments above, the verification message may include at least one nonce to verify that the verification message is valid.

Alternatively or additionally to any of the embodiments above, the host may further be configured to use the group key to communicate with the at least one client.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which.

Figure 1:
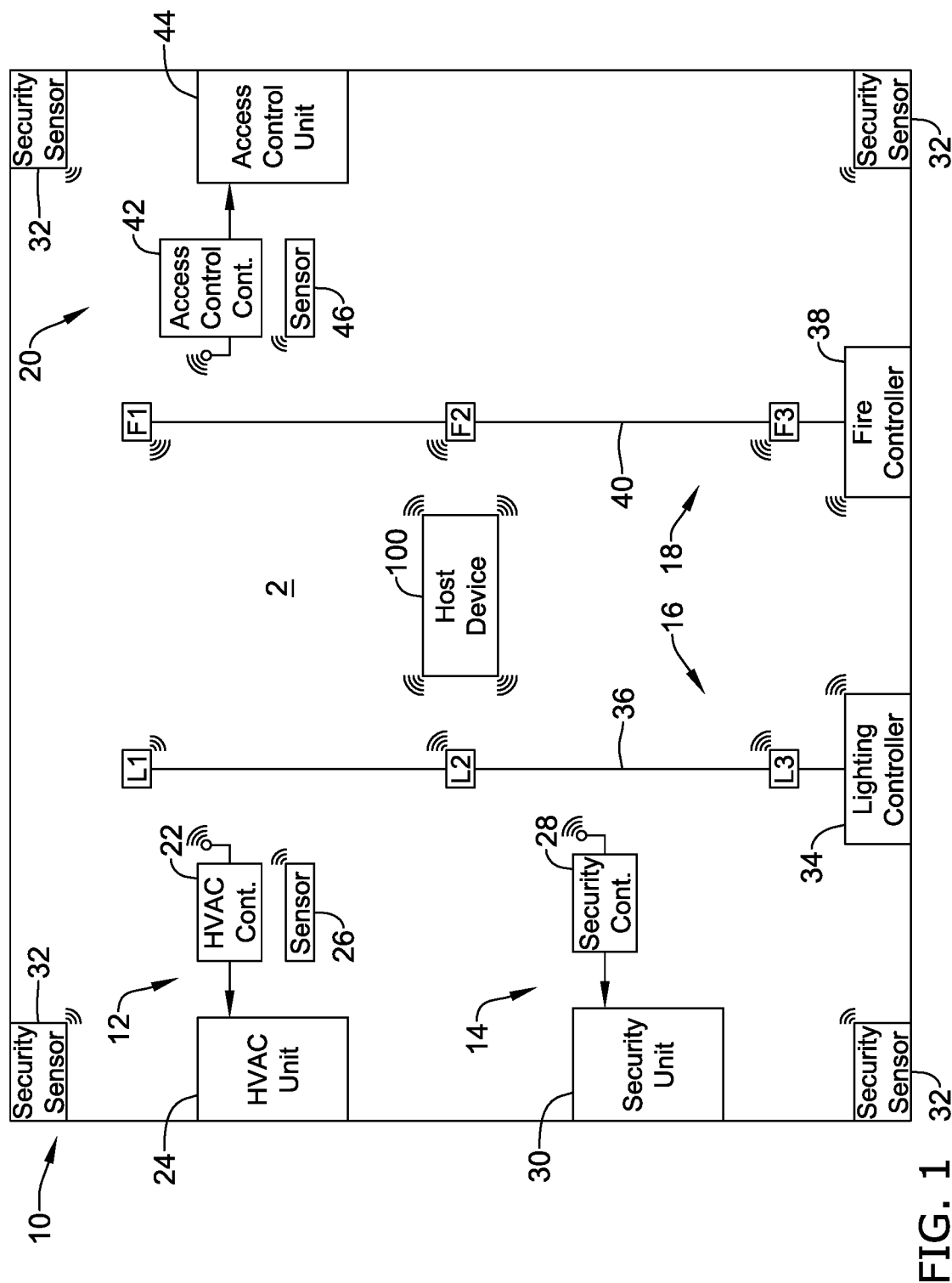
FIG. 1 is a schematic of a building or structure with client devices servicing the building or structure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", and so on, indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure. Although examples of construction, dimensions, and materials may be illustrated for the various elements, those skilled in the art will recognize that many of the examples provided have suitable alternatives that may be utilized.

Devices may be adapted to communicate amongst themselves using wired or wireless communication. Often, wireless communication may be facilitated using wireless communication protocols for command, control, and general data transfer between a host device, a client device, multiple client devices, and/or multiple host devices. Throughout this disclosure, establishing communication between devices (e.g., host-client communication, client-client communication, host-host communication, and so on) may be referred to as enrolling the devices in a communication group. In some cases, when devices are enrolled in the same communication group or are members of the same communication group, they may be capable of communicating directly with one another. Moreover, communication groups can contain multiple devices, a device may be a member of more than one communication group, and communication groups may be expanded to include more members/devices.

In some cases, before a host and a client can communicate with each other, the devices may need to be configured for such transmissions to take place. In some cases, establishing communication between a host and client may begin with an action (e.g., actuation of an input mechanism on a user interface of the device or another remote device) that puts the host and the client in a pairing mode for pairing the client to the host. The client may then sign a pairing request message with its private key and send a client-specific certificate along with the signed pairing request message to the host. The host may then verify that the client-specific certificate is a valid certificate. In some instances, if the client-specific certificate is valid, the host may verify the signature on the pairing request message. If the signature is valid, the host may generate a random value and compute a blinded value. The host may then sign the blinded value using its private key and send a host-specific certificate along with the signed blinded value to the client. In some examples, the client may then verify that the host-specific certificate is a valid certificate. If the host-specific certificate is valid, the client may verify the signature on the blinded value. If the signature is valid, the client may then generate a random value and compute a blinded value. The client may then sign the blinded value using its private key and send the signed blinded value to the host. The host may then verify that the signature on the blinded value is valid and if it is valid, compute a shared value and derive a temporary key. The host may then send a message that includes the shared value to the client. Once the client receives the shared value, the client may also compute a shared value. The client may then compare the shared value received from the host to the computed shared value. If the shared values are the same, the client may derive a temporary key and use the temporary key to decrypt and extract any further information contained in the message sent from the host, such as a group key. The client may then use the group key to encrypt a value and send the encrypted value to the host. The host may then decrypt the value using the group key and verify that the client has received the group key correctly. After verification, the host may compose an acknowledgement message and send it to the client to signal that configuration is complete and the client and host can now communicate with one another using the group key (i.e., the host and the client are enrolled in a communication group).

In some cases, host devices may also be adapted to communicate directly or indirectly with one another using wired or wireless communication. In some cases, before a host and another host can communicate with each other, one or both of the hosts may receive a signal, message, and/or an alert from a client that the client is a member/enrolled in a first communication group with one host and a member/enrolled in a second communication group with the other host. One of the hosts (first host) (e.g., a host that received the signal from the client) may then sign a pairing request message with its private key and send a first host-specific certificate along with the signed pairing request message to the other (second) host. The second host may then verify that the first host-specific certificate is a valid certificate. In some instances, if the first host-specific certificate is valid, the second host may verify the signature on the pairing request message. If the signature is valid, the second host may generate a random value and compute a blinded value. The second host may then sign the blinded value using its private key and send a second host-specific certificate along with the signed blinded value to the first host. In some examples, the first host may then verify that the second host-specific certificate is a valid certificate. If the second host-specific certificate is valid, the first host may verify the signature on the blinded value. If the signature is valid, the first host may then generate a random value and compute a blinded value. The first host may then sign the blinded value using its private key and send the signed blinded value to the second host. The second host may then verify that the signature on the blinded value is valid and if it is valid, compute a shared value and derive a temporary key. The second host may then send a message that includes the shared value to the first host. Once the first host receives the message, the first host may also compute a shared value. The first host may then compare the shared value received from the second host to the computed shared value. If the shared values are the same, the first host may derive a temporary key and use the temporary key to decrypt and extract any further information contained in the message sent from the second host, such as a group key for the second group. The first host may then use the group key for the second group to encrypt a group key for the first group and send the encrypted group key for the first group to the second host. The second host may then decrypt the group key for the first group using the group key for the second group. The second host may then compose an acknowledgement message and send it to the first host to signal that configuration is complete and the first host and the second host can now communicate with each other using both group keys (i.e., the first host and the second host are enrolled in a communication group).

FIG. 1 is a schematic view of a building or structure 10 that includes an illustrative building automation system 2 for controlling one or more client devices servicing the building or structure 10. The building automation system 2, as described herein according to the various illustrative embodiments, may be used to control environmental conditions, lighting conditions, security settings, fire/smoke monitoring, and/or access settings in buildings such as, for example, retail stores, commercial offices, hospitals, clinics, restaurants, single family dwellings, hotels, multi-tenant buildings, and/or multi-use facilities. These are just some examples. It will be generally understood that the building automation system 2 may be expanded and adapted to control and manage other systems and building control components, and may be deployed on a larger scale as the need arises. In addition, the building automation system 2, as described herein, may provide a wireless retrofit solution for facilities employing older building control components that may be wired and that are currently incapable of receiving a wireless or digital command signal. For example, the building automation system 2 may be configured to coordinate operational control of multiple building control components servicing the building or structure 10 that otherwise operate independently of one another. This may increase operational efficiency, reduce operational costs and/or maximize energy efficiency of the building or structure 10 in which the building automation system 2 is deployed.

The illustrative building automation system 2 shown in FIG. 1 includes one or more heating, ventilation, and air condition (HVAC) systems 12, one or more security systems 14, one or more lighting systems 16, one or more fire systems 18, and one or more access control systems 20. In some cases, each system may include a client device configured to provide one or more control signals for controlling one or more building control components of the building automation system 2. For instance, in some cases, the HVAC system 12 may include an HVAC control device 22 used to communicate with and control one or more HVAC units 24 for servicing the building or structure 10. In some cases, the security system 14 may include a security control device 28 used to communicate with and control one or more security units 30 for monitoring the building or structure 10. In some cases, the lighting system 16 may include a lighting control device 34 used to communicate with and control one or more light banks 36 having lighting units L1, L2, and L3 for servicing the building or structure 10. In some cases, the fire system 18 may include a fire control device 38 used to communicate with and control one or more fire banks 40 having fire units F1, F2, and F3 for monitoring and servicing the building or structure 10. In some cases, the access control system may include an access control device 42 used to communicate with and control one or more access control units 44 for allowing access in, out, and/or around the building or structure 10.

In a simplified example, the building automation system 2 may be used to control a single HVAC system 12, a single security system 14, a single lighting system 16, a single fire system 18, and/or a single access control system 20. In other embodiments, the building automation system 2 may be used to communicate with and control multiple discrete building control devices 22, 28, 34, 38, and 42 of multiple systems 12, 14, 16, 18 and 20. The control devices 22, 28, 34, 38, and 42 may be located in different zones or rooms of the building and may be mounted, for example, on a wall, ceiling, or window of the building or structure 10. In some cases, the systems 12, 14, 16, 18, and 20 may be powered by line voltage, and may be powered by the same or different electrical circuit. While FIG. 1 shows control devices 22, 28, 42 controlling three units 24, 30, 44, a lighting control device 34 for controlling lighting bank 36 having three lighting units L1, L2, and L3, and a fire control device 38 for controlling fire bank 40 having three fire units F1, F2, and F3, it is contemplated that the building automation system 2 may be used to control other suitable building control components that may be used to service the building or structure 10.

According to various embodiments, the building automation system 10 may include a host device 100 that may be configured to communicate with the discrete systems 12, 14, 16, 18, and 20 of the building automation system 2 and provide one or more control signals for controlling the building automation system 2. In some cases, the host device 100 may be configured with an application program that configures the clients (i.e., control devices 22, 28, 34, 38, and 42) to establish communication between the host and the clients and/or enroll the clients in communication groups. In some cases, there may be multiple hosts. For instance, in some examples, the host device 100 may be one or many of the control devices 22, 28, 34, 38, and 42.

Additionally, once communication is established, the host device 100 may be configured to control the systems 12, 14, 16, 18, and 20 in one or more rooms and/or zones of the building or structure by activating and/or deactivating the building control devices 22, 28, 34, 38, and 42 to operate the systems in a controlled manner. In some cases, the host device 100 may be configured to transmit a command over a wired or wireless network to one or more of the control devices 22, 28, 34, 38, and 42. In some cases, each control device may be located near or in close proximity to the building control components that it controls. The building control devices 22, 28, 34, 38, and 42 may be configured to transmit a command signal to its corresponding building control component(s) for activating or deactivating the building control component(s) in a desired manner. In some cases, the building control devices 22, 28, 34, 38, and 42 may be configured to receive a command from the host device 100 in a first signal format, and may transmit a corresponding command signal to their respective building control component(s) in a second signal format that their respective building control component(s) are configured to receive. In many cases, the first signal format transmitted by the host device 100 is different from the second signal format received by the units, but this is not required.

In some instances, the building control devices 22, 28, and 42 may be configured to receive signals from one or more sensors 26, 32, and 46 located throughout the building or structure 10. In some cases, the building control devices 34 and 38 may be configured to receive signals from one or more sensors operatively and/or communicatively coupled with the lighting units L1, L2, and L3 and/or the fire units F1, F2, and F3 located throughout the building or structure 10. In some cases, the one or more sensors may be integrated with and form a part of one or more of their respective building control devices 22, 28, 34, 38, and 42. In other cases, one or more sensors may be provided as separate components from the corresponding building control device. In still other instances, some sensors may be separate components of their corresponding building control devices while others may be integrated with their corresponding building control device. These are just some examples. The building control devices 22, 28, 34, 38, 42 and the host device 100 may be configured to use signal(s) received from the one or more sensors to operate or coordinate operation of the various building automation systems 12, 14, 16, 18, and 20 located throughout the building or structure 10.

The one or more sensors 26, 32, 46, L1-L3, and F1-F3 may be any one of a temperature sensor, a humidity sensor, an occupancy sensor, a light sensor, a current sensor, smoke sensor and/or any other suitable sensor. In one example, at least one of the sensors 26, 32, 46, or L1-L3 may be an occupancy sensor. The building control devices 22, 28, 34, 42 and/or the host device 100 may receive a signal from the occupancy sensor indicative of occupancy within a room or zone of the building or structure 10. In response, the building control devices 22, 28, 34, 42 and/or the remote device 100 may send a command to activate one or more building control component(s) located in or servicing the room or zone where occupancy is sensed.

Likewise, in some cases, at least one of the sensors 26 may be a temperature sensor configured to send a signal indicative of the current temperature in a room or zone of the building or structure 10. The building control device 22 and/or the host device 100 may receive the signal indicative of the current temperature from the temperature sensor 26. In response, the building control device 22 and/or the host device 100 may send a command to HVAC unit 24 to activate and/or deactivate the HVAC 24 that is in or is servicing that room or zone to regulate the temperature in accordance with a desired temperature set point.

In yet another example, one or more of the sensors may be a current sensor. The current sensor may be coupled to the one or more building control components and/or an electrical circuit providing electrical power to one or more building control components. The current sensors may be configured to send a signal to a corresponding building control device and/or the host device 100 that indicate an increase or decrease in electrical current associated with the operation of the building control component. This signal may be used to provide confirmation that a command transmitted by a building control device and/or the host device 100 has been successfully received and acted upon by the building control component(s).

These are just a few examples of the configuration of the building automation systems and the communication that can take place between the building automation systems and the host device 100. In other examples, the host device 100 may establish communication with other client devices not located in a building or structure and that perform a variety tasks in a coordinated manner.

Figure 2:
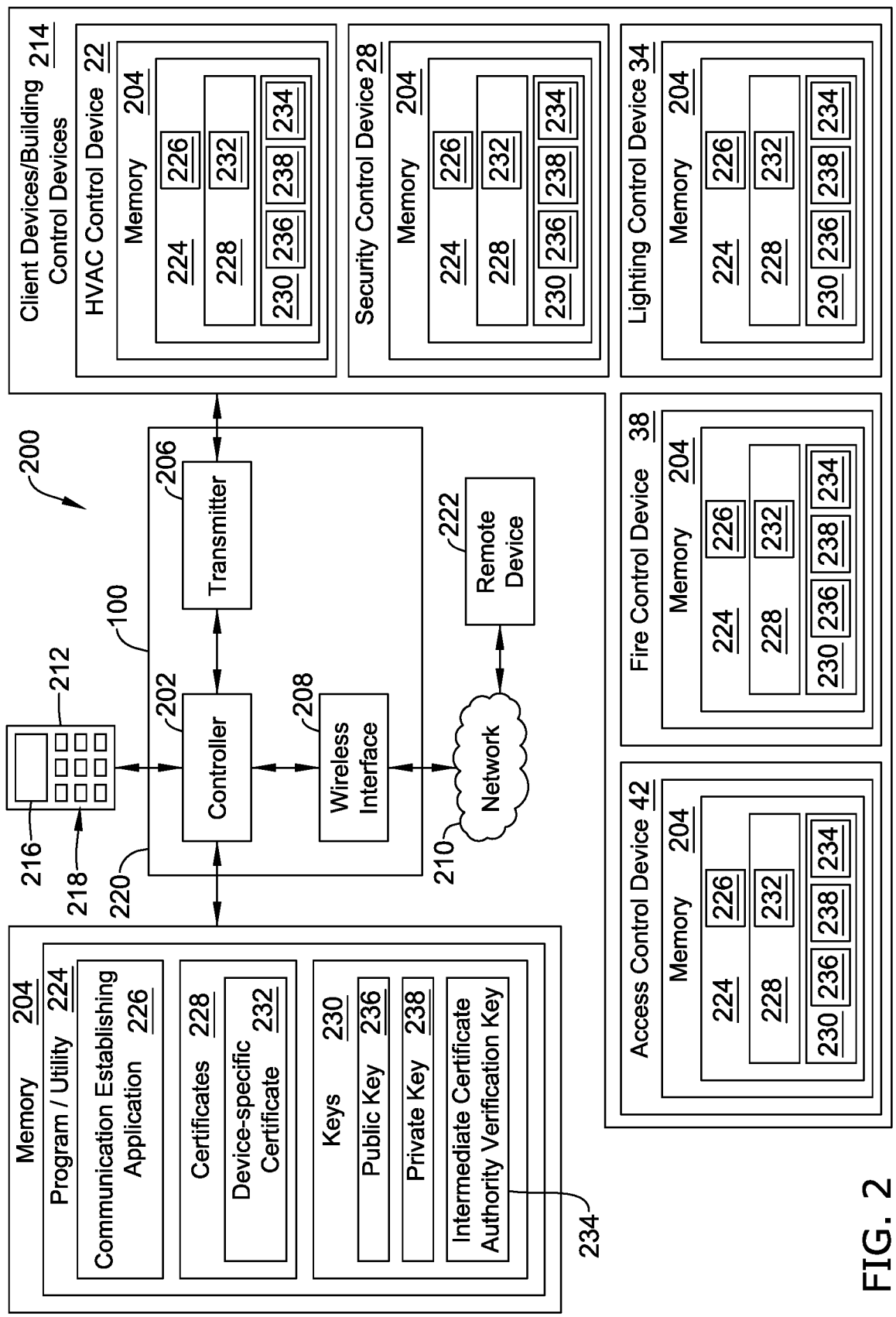
FIG. 2 is a schematic block diagram of a communication system.

FIG. 2 is a schematic block diagram of a communication system 200. In some cases, the communication system 200 may be used to facilitate communication between a host device and client devices 214, such as the host device 100 and control devices 22, 28, 34, 38 and 42 of the building automation system 2 of FIG. 1. In the example shown, the host device 100 includes a controller 202 (e.g., microcontroller, microprocessor, and so forth) operatively coupled to a memory 204, a transmitter 206 (sometimes a transceiver), and a wireless interface 208. The memory 204 may be located in a housing 220 of the host device 100 and/or located remotely from the host device 100.

The transmitter 206 may be configured to communicate using one or more wireless communication protocols, such as cellular communication, ZigBee, REDLINK™, Bluetooth, Wi-Fi, IrDA, infra-red (IR), dedicated short range communication (DSRC), EnOcean, radio frequency (RF) signals and/or any other suitable common or proprietary wireless protocol, as desired. In some cases, the transmitter 206 may communicate commands from the host device 100 to a remotely located client devices/building control devices 214 (e.g., HVAC control device 22, security control device 28, lighting control device 34, fire control device 38, access control device 42, and so on). In certain embodiments, the building control devices 214 or an onboard controller of the building control devices 214 may include a receiver, and the controller 202 may use the transmitter 206 to establish communication with the building control devices 214 through the receivers. The controller 202 may then use the transmitter 206 to transmit control commands to the building control devices 214, which are then carried out by the building control devices 214. For example, in certain embodiments, the transmitter 206 of the host device 100 may communicate commands with the HVAC control device 22 using any suitable communication protocol, such as the BACnet protocol. In some cases, the transmitter 206 may communicate with the security device 28 using any suitable communication protocol, such as the DC-09 protocol. In some cases, the transmitter 206 may communicate with the fire control device 38 using any suitable communication protocol, such as the Modbus protocol. In some cases, the transmitter 206 may communicate with the access control device 42 using any suitable communication protocol, such as the EnOcean protocol. In some cases, the transmitter 206 may communicate with the lighting control device 34 using any suitable communication protocol, such as the DALI protocol. These are just examples of building control network protocols that may be used to facilitate communication between the host device 100 and the building control devices 214. Other building control communication protocols may include, 1-Wire, C-Bus, CC-Link Industrial Networks, DSI, Dynet, KNX, LonTalk, oBIX, VSCP, xAP, X10, Z-Wave, INSTEON, TCIP, Ethernet, and/or any other suitable communication scheme. It is contemplated that the communication may be uni-directional or bi-directional, as desired.

In some instances, the controller 202 of the host device 100 may include a pre-programmed chip, such as a very-large-scale integration (VLSI) chip and/or an application specific integrated circuit (ASIC). In such embodiments, the chip may be pre-programmed with control logic in order to control the operation of the host device 100. In some cases, the pre-programmed chip may implement a state machine that performs the desired functions. By using a pre-programmed chip, the controller 202 may use less power than other programmable circuits (e.g., general purpose programmable microprocessors) while still being able to maintain basic functionality. In other instances, the controller 202 may include a programmable microprocessor. Such a programmable microprocessor may allow a user to modify the control logic of the host device 100 even after it is installed in the field (e.g., firmware update), which may allow for greater flexibility of the host device 100 in the field over using a pre-programmed ASIC.

According to various embodiments, the wireless interface 208 of the host device 100 may permit the host device 100 to communicate over one or more wireless networks, such as network 210, for example. In some cases, the wireless interface 208 may utilize a wireless protocol to communicate with a remote device 222 over network 210. In some cases, network 210 may include a Local Area Networks (LAN) such as a Wi-Fi network and/or a Wide Area Networks (WAN) such as the Internet and/or a cellular network. These are just some examples. Furthermore, in some examples, the network 210 may incorporate copper or other metal transmission cables, optical transmission fibers, wireless transmission, routers, firewalls, switches, gateway computers and/or edge servers.

In the example shown in FIG. 2, a user interface 212 is operatively coupled to the host device 100, and permits the host device 100 to display and/or solicit information, as well as accept one or more user interactions with the host device 100, such as placing the host device 100 into a pairing mode. Through the user interface 212, the user may, for example, place the host device 100 into a pairing mode to establish communication with one or more building control devices 214. In some cases, once the host device 100 is in the pairing mode, the host device 100 may be able to group one or more building control devices 214 to form a communication group and establish communication with multiple and diverse client devices. Alternatively, or in addition, the host device 100 may be able to set or modify communication encryption keys and certificates (e.g., certificates 228 and keys 230) and/or set or modify communication groups. When provided, the ability to establish, monitor, and alter communication and/or communication protocols may facilitate improved and more secure communication between the host device 100, client devices (e.g., the building control devices 214), and other host devices (not shown in FIG. 2).

In some cases, the user interface 212 may be a physical user interface that is accessible at the host device 100 and may include a display 216 and/or a distinct keypad 218. The display 216 may be any suitable display. In some instances, the display 216 may include a liquid crystal display (LCD), an OLED, and other display technologies, and in some cases a fixed segment display, a dot matrix LCD display, a 7-segment type display, and/or may include one or more LEDs. In some cases, the display 216 may include a touch screen LCD panel that functions as both the display 216 and keypad 218. The user interface 212 may be adapted to solicit information values for a number of operating parameters, programmable setpoints, and/or to receive such values, but this is not required. In some cases, the user interface 212 may be provided as a separate unit from the host device 100, and may facilitate a user's interactions with the host device 100. For example, the user interface 212 may be provided as part of a remote device (e.g., remote device 222), such as a smart phone, a tablet computer, a laptop computer, or a desktop computer. In some cases, the user interface 212 may communicate with the host device via a network such as, for example, a network 210 (e.g., Internet, Wifi, and so on).

In various embodiments, the memory 204 of the host device 100 may be operatively coupled to the controller 202 and may be used to store any desired information, such as the aforementioned communication establishing application program 226, certificates 228, keys 230, network credentials, schedule times, zones and groupings of building control devices 214, and the like. The memory 204 may be any suitable type of storage device including, but not limited to, RAM, ROM, EPROM, flash memory (e.g., NAND flash memory), an external SPI flash memory, a hard drive, and/or the like. In some cases, the memory 204 may include two or more types of memory. For example, the memory 204 may include a RAM, a ROM and a flash memory module.

Program/utility 224 may be stored in the memory 204 and may include a set of application program modules (e.g., software), such as the communication establishing application 226. In some cases, the program/utility 224 may include additional program modules as well as an operating system, one or more other application program modules, and program data such as certificates 228 and keys 230. According to various embodiments, the application program modules (e.g., the communication establishing application 226) may include additional applications, such as a cryptographically strong pseudo-random number generator (PRNG), a Diffie-Hellman value generator, a group key generator, a temporary key generator, a nonces generator, for example (all not shown in FIG. 2). In certain embodiments, the communication establishing application 226, the certificates 228, and the keys 230, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The communication establishing application 226 may execute entirely on the host device 100, partly on the host device 100, as a stand-alone software package, and/or partly on the host device 100 and partly on each building control device 214. In the latter scenario, establishing communication between a host and one or more building control devices 214 (e.g., the HVAC control device 22 and the security control device 28) may begin with a user setting the host device 100, the HVAC control device 22, and the security control device 28 each in a pairing mode. In pairing mode, the host device 100, the HVAC control device 22, and the security control device 28 may all access the communication establishing application 226 located in their memory 204. In some cases, the communication establishing application 226 may provide different instructions to the devices. For instance, in this example, the instructions for the host device may be different than the instructions for the HVAC control device 22 and the security control device 28 since the HVAC control device 22 and the security control device 28 are each clients. In some cases, the communication establishing application 226 may provide instructions for the HVAC control device 22 and the security control device 28 to each sign a pairing request message with their private key 238 and send the signed pairing request messages and their device-specific certificate 232 (i.e., an HVAC control device-certificate and a security control device-certificate) to the host device 100.

Once the host device 100 receives the pairing request messages and the client-specific certificates 232, the communication establishing application 226 may provide instructions to the controller 202 of the host device 100 to verify the signatures on the client-specific certificates for each client 22, 28. In some examples, the controller 202 may access an intermediate certificate authority (CA) verification key 234 from memory 204 to verify that the signatures on the client-specific certificates 232 are valid. If the certificates 232 are valid, the controller 202 may then access a public key 236 from memory to verify that the signatures on the pairing request messages are valid signatures. If the signatures are valid, the communication establishing application 226 may then provide instructions to the controller 202 to generate a random value. In some examples, the controller 202 may then use the random value to compute a blinded value. In cryptography, blinding may be a technique by which the host device 100 can compute a function for clients 22, 28 in an encoded form without knowing either the real input or the real output. Blinding techniques also have applications to preventing side-channel attacks on encryption devices. One type of blinding is the blind value. In a blind value protocol, the host device 100 may digitally sign a message without being able to learn its content. In this example, the controller 202 may use private key 238 to sign the blinded value and send a host device 100-certificate 232 and the signed blinded value to clients 22, 28.

Once clients 22, 28 receive the host device 100-certificate 232 and the signed blinded value from the host device 100, the communication establishing application 226 may provide instructions to each client 22, 28 to verify the signature on the host device 100-certificate 232. In some examples, clients 22, 28 may access the intermediate CA verification key 234 from memory 204 to verify that the signature on the host device 100-certificate 232 is valid. If the certificate is valid, clients 22, 28 may then access the public key 236 from memory 204 to verify that the blinded value has a valid signature. If the signature is valid, the communication establishing application 226 may then provide instructions to clients 22, 28 to each generate a random value to compute a blinded value. In some instances, clients 22, 28 may use private keys 238 to sign the blinded value and send the signed blinded values to host device 100.

Once the host device 100 receives the singed blinded values, the communication establishing application 226 may provide instructions to the controller 202 to verify that the blinded values have valid signatures. If the signatures are valid, the communication establishing application 226 may then provide instructions to the controller 202 to compute a shared value. In some examples, the controller may use key agreement protocol for example, Elliptic-curve Diffie-Hellman (ECDH), that allows the host device 100 and clients 22, 28, each having an elliptic-curve public-private key pair, to establish the shared value over an insecure channel. This shared value may be directly used as a group key or to derive a group key. The group key, can then be used to encrypt subsequent communications using a symmetric-key cipher. In some examples, the communication establishing application 226 may then provide instructions to the controller 202 to derive a temporary key and send the a message including the shared value to clients 22, 28.

In some cases, the communication establishing application 226 may also provide instructions to the controller 202 to generate one or more nonces and, if not already generated for a current group period, the group key and a key encryption key for later key updates. For instance, the communication establishing application 226 may provide an expiration date for a group key (i.e., a time-duration for the group key). Accordingly, when a group key expires, the controller 202 may generate a new group key for the group to facilitate continued and secure communication for the group (i.e., between the host device 100 and building control devices 214). In some cases, the key encryption key may be generated for each new group key and used by the building control devices 214 to decrypt and identify the new group key. Moreover, in some cases, the host device may encrypt the one or more nonces, the group key, and the key encryption key using the temporary key and include the encryption with the message that is sent to clients 22, 28.

Once clients 22, 28 receive the message, the communication establishing application 226 may provide instructions to each client to compute a shared value. Similar to the host device 100, clients may use key agreement protocol for example, Elliptic-curve Diffie-Hellman (ECDH), to compute the shared value. Clients 22, 28 may then compare the shared values they computed to the shared value received in the message. In some cases, if the shared values are equal, clients 22, 28 may then derive a temporary key and use the temporary key to decrypt and extract the one or more nonces, the group key, and the key encryption key from the message. Clients 22, 28 may then verify the one or more nonces and set the group key generated by the host device 100 as the group key. Clients 22, 28 may then use the group key to encrypt the one or more nonces and send the encrypted one or more nonces to the host device 100.

Once the host device receives the encrypted one or more nonces, the communication establishing application 226 may provide instructions for the controller 202 to decrypt the one or more nonces and determine that the one or more nonces are equal to the one or more nonces that the controller 202 generated to verify that clients 22, 28 received the group key correctly. If the one or more nonces are equal and clients 22, 28 received the group key correctly, the communication establishing application 226 may provide instructions for the controller 202 to compute a system-fixed acknowledgment (ACK) message that includes one or more nonces and encrypt the ACK message using the group key. In some instances, the ACK message may be critical to ensure that ongoing communication proceeds smoothly. The concept of an ACK message is commonly used in many data networks protocols. In some cases, the controller 202 may then send the ACK message to clients 22, 28 to signal that the controller 202 has completed the key exchange.

Once clients 22, 28 have received the ACK message, the communication establishing application 226 may provide instructions for clients 22, 28 to use the group key to decrypt the ACK message and extract the one or more nonces. Clients 22, 28 may then verify successful completion of the key exchange by comparing the one or more nonces to one or more previously received nonces. If the one or more nonces are equal to the one or more previously received nonce, clients 22, 28 may identify the successful completion of the key exchange. Additionally, the host device 100 and clients 22, 28 may now be configured for secured communication with one another using the group key to encrypt and decrypt messages. For instance, the host device 100 and clients 22, 28 may be configured into a CCM mode to enable cryptographic messaging and communication. AES-CCM may be a recommended cipher/mode as it is supported by the dedicated encryption hardware and it allows for the authentication of data alongside the encryption of sensitive data. However, this is not necessary and the host device 100 and the building control devices 214 may be configured into several different ciphers/modes to facilitate cryptographic messaging and communication. In some examples, by using the communication establishing application 226 and technique, an adversary without a valid signed certificate and associated private signing key cannot generate a valid signature in many of the exchanged messages, thus ending the communication establishing application 226 without an exchange of keys. Furthermore, as fresh keys and nonces are used with each client, replay attacks may be thwarted.

As discussed above, in some instances, the wireless interface 208 of the host device 100 may permit the host device 100 to communicate over one or more additional wired or wireless networks (e.g., the network 210) that may accommodate remote access and/or control of the host device 100 via a remote device 222 such as, for example, a smart phone, tablet computer, laptop computer, personal computer, PDA, and/or the like. In some cases, the remote device 222 may provide a primary and/or a secondary user interface for the user to interact with the host device 100. In some cases, the host device 100 may utilize a wireless protocol to communicate with the remote device 222 over the network 210.

In some cases, the remote device 222 may execute an application program that facilitates communication and control of the controller 100. In some cases, the communication establishing application 226 may execute entirely or partly on the remote device 222. The communication establishing application program may be provided by and downloaded from an external web service (e.g., Apple Inc.'s ITUNES®, Google Inc.'s Google Play, a proprietary server, and so forth) for this purpose, but this is not necessarily required. In one example, the communication establishing application 226 may allow the remote device to provide instructions to the host device 100 to establish communication with one or more clients (e.g., building control devices 214). Additionally, the remote device 222 may be capable of placing the host device 100 and one or more clients into a pairing mode to allow the host device 100 and clients to begin establishing communication.

Figure 3:
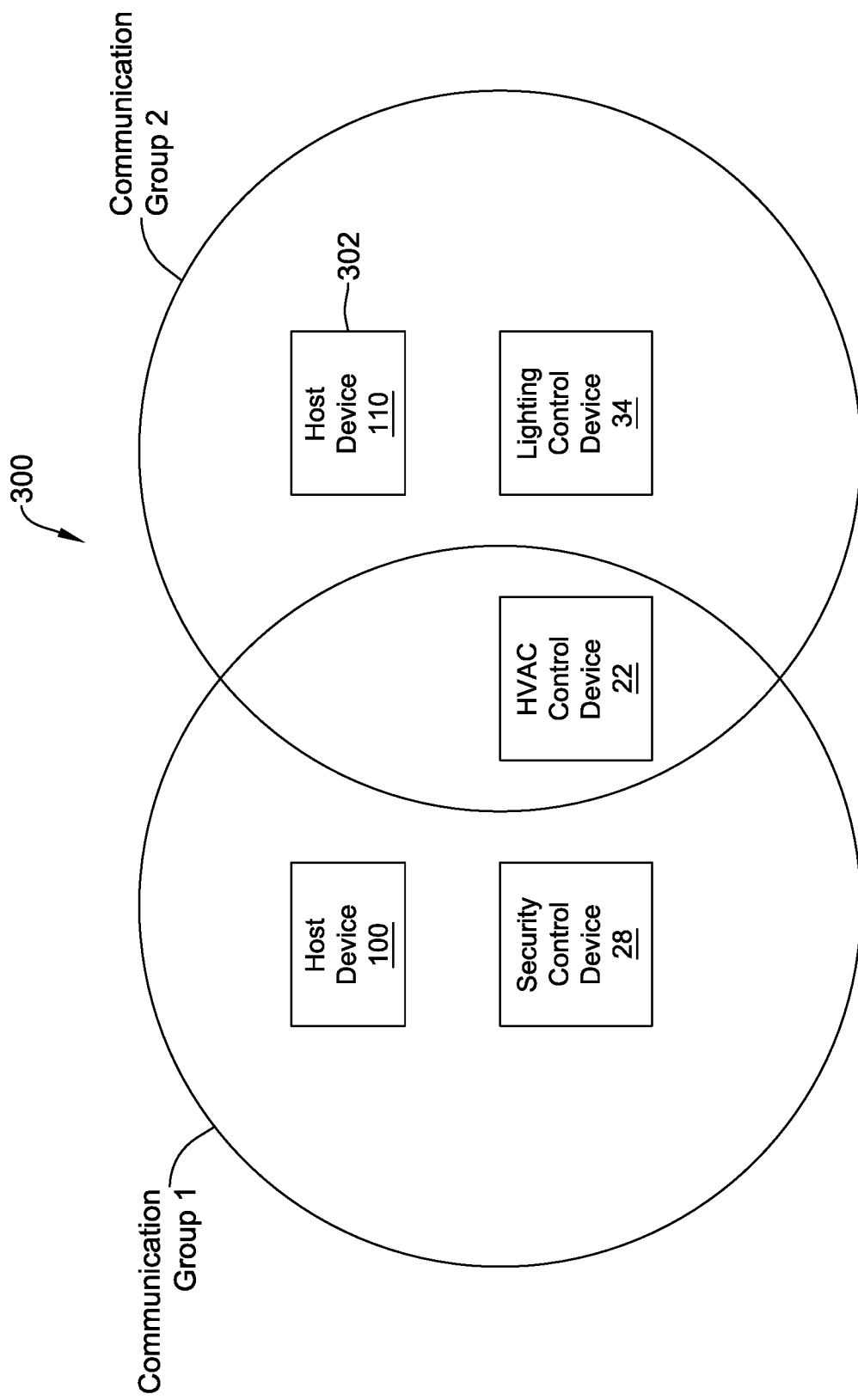
FIG. 3 is a schematic block diagram of another communication system.

FIG. 3 is a schematic block diagram of a communication system 300. In some cases, the communication system 300 may be used to facilitate communication between a host device and another host device, such as the host device 100 and host device 110. In the example shown, the host device 110 may be configured similar to the host device 100, described in FIG. 2. For example, the host device 110 may include a controller (e.g., microcontroller, microprocessor, and so on) operatively coupled to a memory, a transmitter (sometimes a transceiver), and a wireless interface (not shown in FIG. 3). The memory may be located in a housing 302 of the host device 110 and/or located remotely from the host device 110. Moreover, in some instances, the communication establishing application 226 may execute entirely on the host devices 100, 110, partly on the host devices 100, 110, as a stand-alone software package, and/or partly on the host devices 100, 110 and partly on the building control devices 214 (from FIG. 2), such as the HVAC control device 22, the security control device 28, and/or the lighting control device 34, for example. As shown in FIG. 3, there exists two communication groups, communication group 1 (hereinafter referred to as group 1) and communication group 2 (hereinafter referred to as group 2). Group 1 includes the host device 100, as the host of group 1, and the HVAC control device 22 and the security control device 28, as the clients of group 1. Group 2 includes the host device 110, as the host of group 2, and the HVAC control device 22 and the lighting control device 28, as the clients of group 2. FIG. 3 is used as an illustrative example and in some cases, there may be more or less communication groups.

As can be seen, group 1 and group 2 share a common client, the HVAC control device 22. That is, the HVAC control device 22 may be configured to communicate with both the host device 100 and the host device 110. Moreover, the HVAC control device 22 may be configured to communicate with all client devices from group 1 and group 2. As such, in some cases, the HVAC control device 22 may identify that it is a member of both group 1 and group 2 and access the communication establishing application. The communication establishing application may then provide instructions to the HVAC control device 22 to send a signal, message, and/or an alert to either host 100, host 110, or both that the HVAC control device 22 is a member/enrolled in group 1 with the host 100 and a member/enrolled in group 2 with the host 110. In some examples, the communication establishing application may provide instructions for the host device 100 to sign a pairing request message (e.g., a host-to-host enrollment request message) with their private key and send the signed pairing request message and a host device 100-certificate to the host device 110.

Once the host device 110 receives the pairing request messages and the host device 100-certificate, the communication establishing application may then provide instructions to the host device 110 to verify the signature on the host device 100-certificate. In some examples, the host device 110 may access an intermediate CA verification key to verify that the signature on the host device 100-certificate is valid. If the certificate is valid, the host device 110 may then access a public key to verify that the signature on the pairing request message is a valid signature. If the signature is valid, the communication establishing application may then provide instructions to the host device 110 to generate a random value. In some examples, the host device 110 may then use the random value to compute a blinded value. In this example, the host device 110 may use their private key to sign the blinded value and send a host device 110-certificate and the signed blinded value to the host device 100.

Once the host device 100 receives the host device 110-certificate and the signed blinded value from the host device 110, the communication establishing application may provide instructions to each the host device 100 to verify the signature on the host device 110-certificate. In some examples, the host device 100 may access the intermediate CA verification key to verify that the signature on the host device 110-certificate is valid. If the certificate is valid, the host device 100 may then access the public key to verify that the blinded value has a valid signature. If the signature is valid, the communication establishing application may then provide instructions to the host device 100 to generate a random value to compute a blinded value. In some instances, the host device 100 may use their private key to sign the blinded value and send the signed blinded value to host device 110.

Once the host device 110 receives the singed blinded value, the communication establishing application may then provide instructions to the host device 110 to verify that the blinded value has a valid signature. If the signature is valid, the communication establishing application may then provide instructions to the host device 110 to compute a shared value. In some examples, the host device 110 may use key agreement protocol for example, Elliptic-curve Diffie-Hellman (ECDH), that allows the host device 110 and the host device 100, each having an elliptic-curve public-private key pair, to establish the shared value over an insecure channel. In some examples, the communication establishing application may then provide instructions to the host device 110 to derive a temporary key and send a message including the shared value to the host device 100.

In some cases, the communication establishing application may also provide instructions to the host device 100 to generate one or more nonces and retrieve its previously-generated first group key and a first key encryption key for later key updates. Moreover, in some cases, the host device 100 may encrypt the one or more nonces, the first group key, and the first key encryption key using the temporary key and include the encryption with the message that is sent to the host device 110.

Once the host device 110 receives the message, the communication establishing application may provide instructions to the host device 110 to compute a shared value. Similar to the host device 100, the host device 110 may use key agreement protocol for example, Elliptic-curve Diffie-Hellman (ECDH), to compute the shared value. The host device 110 may then compare the shared values it computed to the shared value received in the message. In some cases, if the shared values are equal, the host device 110 may then derive a temporary key and use the temporary key to decrypt and extract the one or more nonces, the first group key, and the first key encryption key from the message. The host device 110 may then verify the one or more nonces and store the first group key and the first key encryption key sent by the host device 100. The host device 110 may then retrieve its previously-generated second group key and a second key encryption key, use the first group key to encrypt the one or more nonces, the second group key, and the second key encryption key, and send the encryption to the host device 100.

Once the host device 100 receives the encryption, the communication establishing application may provide instructions for the host device 100 to decrypt the one or more nonces, the second group key, and the second key encryption key, and determine that the one or more nonces are equal to the one or more nonces that the host device 100 generated, to verify that the host device 110 received the first group key correctly. If the one or more nonces are equal and the host device 110 received the first group key correctly, the communication establishing application may provide instructions for the host device 100 to compute a system-fixed acknowledgment (ACK) message that includes one or more nonces and encrypt the ACK message using the second group key. In some cases, the host device 100 may then send the ACK message to the host device 110 to signal that the host device 100 has completed the key exchange.

Once the host device 110 has received the ACK message, the communication establishing application may provide instructions for the host device 110 to use the second group key to decrypt the ACK message and extract the one or more nonces. The host device 110 may then verify successful completion of the key exchange by comparing the one or more nonces to one or more previously received nonces. If the one or more nonces are equal to the one or more previously received nonce, the host device 110 may identify the successful completion of the key exchange. Additionally, the host device 100 and the host device 110 may now be configured for secured communication with each other (i.e., enrolled in the same group) using the first and second group keys to encrypt and decrypt messages. For instance, the host device 100 and the host device 110 may be configured into a CCM mode to enable cryptographic messaging and communication. AES-CCM may be a recommended cipher/mode as it is supported by the dedicated encryption hardware and it allows for the authentication of data alongside the encryption of sensitive data. However, this is not necessary and the host device 100 and the host device 110 may be configured into several different ciphers/modes to facilitate cryptographic messaging and communication. In some examples, by using the communication establishing application and technique, an adversary without a valid signed certificate and associated private signing key cannot generate a valid signature in many of the exchanged messages, thus ending the communication establishing application without an exchange of keys. Furthermore, as fresh keys and nonces are used with each host, replay attacks may be thwarted.

Moreover, in some cases, rather than establishing a new, separate key for host-to-host communications, the communication establishing application and technique described in regard to FIG. 3, may allow the hosts to take advantage of the sync/more messages for their communication by enrolling with the other hosts in their group in a manner nearly identical to host-client enrollment, described in regard to FIG. 2. In this scenario, hosts, alerted to the presence of other hosts connected to shared multi-system/multi-group clients, may initiate the enrollment process, at the end of which, they have learned the group keys of all the other hosts to which they are connected by a multi-system/multi-group client. They then can use these keys to listen in on the sync messages of the other hosts, effectively replicating the proposed host-to-host messaging.

Figure 4:
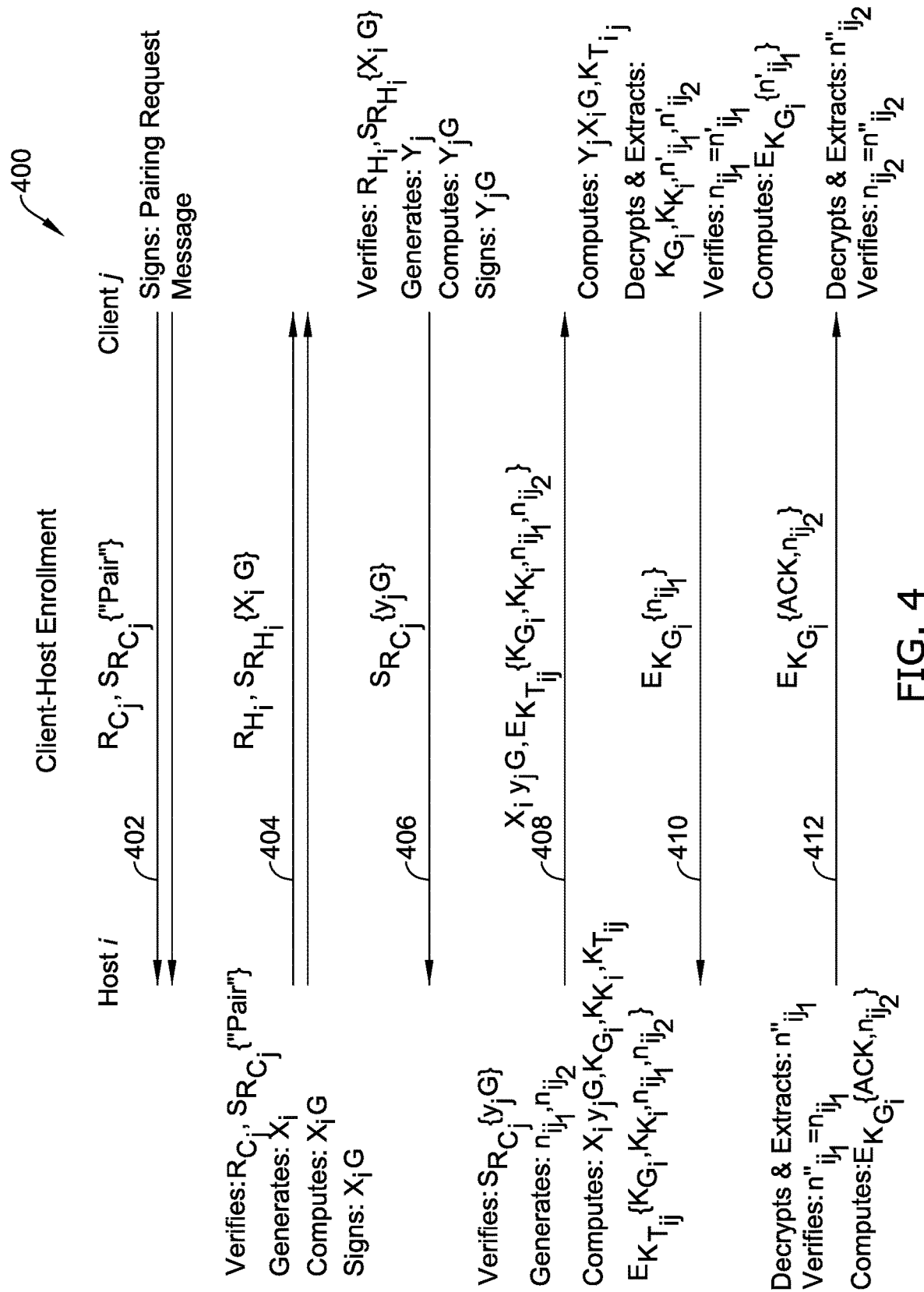
FIG. 4 is an example method of establishing communication between a host and a client.

FIG. 4 depicts an example method 400 of establishing communication between a host and a client. The method 400 may be implemented once for every client that joins the communication group. In some cases, both the host and the client may each have their own embedded device-specific certificate and associated private key. Moreover, the host and client may also each have an embedded certificate with a root Certificate Authority (CA) public verification key as well as that of the an intermediate CA key that is used to sign their device specific certificate. In some cases, the certificates may be assigned a validity period long enough to ensure that they, in effect, never expire. The host and client may also have access to a cryptographically strong PRNG.

In some cases, method 400 may build upon a standard authenticated Diffie-Hellman style scheme that can prevent replay and MITM attacks. To describe method 400 the following notation will be used: $H_i$ denotes Host I; $C_j$ denotes Client j; $R_H$ denotes a certificate with intermediate CA public verification key; $R_{Cj}$ denotes device-specific certificate and associated private key for client j; $x_i, y_j$ denote randomly generated secrets belonging to host i and client j, respectively, to be used as an ECDH point multiplier; vG denotes The elliptic curve Diffie-Hellman blinding of the random value v; $n_i$ denotes nonces or values that should be used only once and never repeated for any invocation of the method 400; KDF(u) denotes key derivation function that takes input u and generates one (or more) keys; $K_{Tij}$ denotes a temporary key established between host i and client j; $K_{Gi}$ denotes a group key associated with host i and its paired clients; $E\_K_k\{m_1, m_2, \ldots, m_i\}$ denotes the encryption of the concatenation of messages $m_1, m_2, \ldots, m_i$ using key $K_k$; and $S_{Rx}\{m\}$ denotes the message m along with its signature created using the private key associated with certificate $R_x$.

Before method 400 begins, Host i and Client j may both be set into a pairing mode. In the pairing mode, Host i and the Client j may be able to perform method 400. At step 402, Client j may sign a pairing request message with their private key and send the signed pairing request message $S_{Rcj}\{\text{"Pair"}\}$ and a Client j-certificate $R_{Cj}$ to Host i. Once Host i receives the pairing request message $S_{RCj}\{\text{"Pair"}\}$ and the Client j-certificate $R_{Cj}$, at step 404, Host i may verify the signature on the Client j-certificate $R_{Cj}$. In some examples, Host i may verify the signature on the Client j-certificate $R_{Cj}$ using an intermediate CA verification key $R_H$. If the Client j-certificate $R_{Cj}$ is valid, Host i may then verify that the signature on the pairing request message $S_{Rcj}\{\text{"Pair"}\}$ is a valid signature. If the signature is valid, Host i may then generate a random value $x_i$. In some examples, Host i may use the random value $x_i$ to compute a blinded value $x_iG$. In this example, Host i may use their private key to sign the blinded value and send a Host i-certificate $R_{Hi}$ and the signed blinded value $S_{RHi}\{\text{"}x_iG\text{"}\}$ to Client j.

Once Client j receives the Host i-certificate $R_{Hi}$ and the signed blinded value $S_{Rcj}\{\text{"}x_iG\text{"}\}$, at step 406, Client j may verify the signature on the Host i-certificate $R_H$ In some examples, Client j may verify the signature on the Host i-certificate $R_{Hi}$ using an intermediate CA verification key $R_H$. If the Host i-certificate $R_{Hi}$ is valid, Client j may then verify that the signature on the blinded value $S_{RHi}\{\text{"}x_iG\text{"}\}$ is valid. If the signature is valid, Client j may then generate a random value $y_j$. In some examples, Client j may use the random value $y_j$ to compute a blinded value $y_jG$. In this example, Client j may use their private key to sign the blinded value and send the signed blinded value $S_{Rcj}\{\text{"}y_jG\text{"}\}$ to Host i.

Once Host i receives the signed blinded value $S_{Rcj}\{\text{"}y_jG\text{"}\}$, at step 408, Host i may verify that the signature on the blinded value $S_{Rcj}\{\text{"}y_jG\text{"}\}$ is valid. If the signature is valid, Host i may compute a shared Diffie-Hellman value $x_iy_jG$, derive a temporary key $K_{Tij}=KDF(x_iy_jG)$, and send a message including the shared value $x_iy_jG$, to Client j. In some cases, Host i may also generate one or more nonces $n_{ij1}$ and $n_{ij2}$ and, if not already generated for a current group period, group key $K_{Gi}$ and a key encryption key $K_k$, for later key updates. Moreover, in some cases, Host i may encrypt nonces $n_{ij1}$ and $n_{ij2}$, the group key $K_{Gi}$, and the key encryption key $K_k$ using the temporary key $K_{Tij}$ and include the encrypted nonces $n_{ij1}$ and $n_{ij2}$, the group key $K_{Gi}$, and the key encryption key $K_k$ in the message (i.e., Host i may send $x_iy_jG\ E\_K_{Tij}\{K_{Gi},K_k,n_{ij1},n_{ij2}\}$ to Client j).

Once Client j receives the message, at step 410, Client j may compute a shared value $y_jx_iG$. Client j may then compare the shared value $y_jx_iG$ to the shared value $x_iy_jG$. In some cases, if the shared values are equal ($y_jx_iG=x_iy_jG$), Client j may then derive the temporary key $K_{Tij}$ and use the temporary key $K_{Tij}$ to decrypt and extract the one or more nonces $n_{ij1}$ and $n_{ij2}$, the group key $K_{Gi}$, and the key encryption key $K_k$ from the message. Client j may then verify that $n_{ij1}=n'_{ij1}$ and set $K_{Gi}$ as the group key. Client j may then generate $E\_K_{Fi}\{n'_i\}$ and send it to Host i.

Once Host i receives $E\_K_{Gi}\{n'_i\}$, at step 412, Host i may decrypt $E\_K_{Gi}\{n'_i\}$ to recover $n''_i$. In some examples, Host i may then determine whether $n_i=n''_i$, to verify that Client j received the group key $K_{Gi}$ correctly. If $n_i=n''_i$ and Client j received the group key $K_{Gi}$ correctly, Host i may then compute $E\_K_{Gi}\{ACK,n'_{ij2}\}$, where ACK may be some system-fixed acknowledgement message. Host i may then send $E\_K_{Gi}\{ACK,n'_{ij2}\}$ to Client j to signal that Host i has completed the key exchange. Once Client j receives $E\_K_{Gi}\{ACK,n'_{ij2}\}$, Client j may decrypt the $E\_K_{Gi}\{ACK,n'_{ij2}\}$, extract $n''_{ij2}$, and verify that it $n''_{ij2}$ is equal to the value extracted at step 410, to verify the successful completion of the key exchange. Method 400 may then end and Host i and Client j may use the group key $K_{Gi}$ for group communications. For instance, as stated above, Host i and Client j may be configured into a CCM mode to enable cryptographic messaging and communication. AES-CCM may be a recommended cipher/mode as it is supported by the dedicated encryption hardware and it allows for the authentication of data alongside the encryption of sensitive data. However, this is not necessary and the Host i and Client j may be configured into several different ciphers/modes to facilitate cryptographic messaging and communication. In some examples, using method 400, an adversary without a valid signed certificate and associated private signing key cannot generate a valid signature in many of the exchanged messages, thus ending method 400 without an exchange of keys. Furthermore, as fresh keys and nonces are used with each client, replay attacks may be thwarted.

In some cases, each host/client pairing, depicted in method 400, may require six rounds of communication with likely eight message frames required to carry the data. Total message size may be approximately 264 bytes for the host (280 if performing scheduled key update) and 406 bytes for the client, with the largest message size of approximately 200 bytes for each. Note that these sizes may go up if encoding or formatting is required.

In some examples, the method 400 may require the host to create two signatures, verify three signatures, compute two elliptic curve point multiplications, generate approximately 68 random bytes (84 if performing scheduled key update), not counting random bits used in signature generation (an additional 36 bytes per signature), run the key derivation function to generate one AES key, and do two AES encryptions and one AES decryption on a total of four blocks (five if performing scheduled key update). In some cases, the client may be required to create three signatures, verify two signatures, compute two additional elliptic curve point multiplications, generate approximately 30 random bytes, not counting those for signature generation, run the key derivation function to generate one AES key, and do one AES encryption and two AES decryptions.

In some cases, the key derivation function (KDF) used may be a Single-Step KDF using the following implementation-dependent parameters: H(x) will be a hash function SHA-256, provided by the Mocana library; keydatalen may be 256; OtherInfo may have the following subfields: AlgorithimID may be the byte-string that contains the ASCII encoding of the string "AES-256"; PartyUInfo may be the concatenation of the host's certificate, $R_{Hi}$, and the host's public contribution to the blinded value $x_iG$; PartyVInfo may be the concatenation of the client's certificate, $R_{Cj}$, and the client's public contribution to the blinded value $y_jG$.

Given this, in some cases, the key derivation may proceed as follows: Set counter to the byte string containing 32 bit, big-endian value 1, i.e. {0x00, 0x00, 0x00, 0x01}; Set Z to be the byte string representing the computed shared secret $x_iy_jG$. This can be the string pointed to by the sharedSecret parameter following the successful completion of the call to the Mocana library function ECDH_generateSharedSecretAux; Compute the OtherInfo parameter described above; and Compute $K_{Tij}$=H(counter∥Z∥OtherInfo) where ∥ is byte string concatenation.

Figure 5:
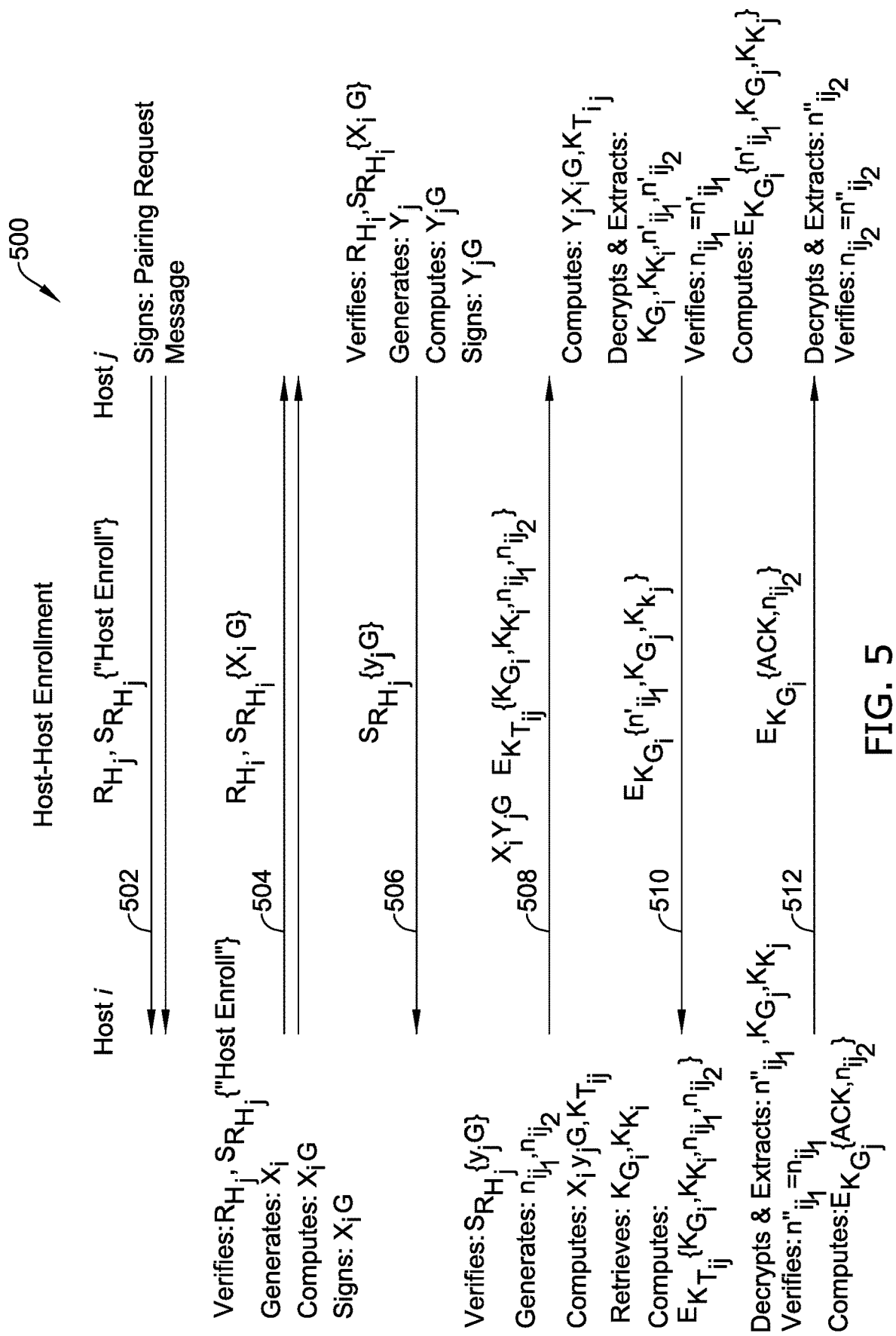
FIG. 5 is an example method of establishing communication between two hosts.

FIG. 5 depicts an example method 500 of establishing communication between Host i ($H_j$) and Host j ($H_i$). The method 500 may be implemented each time two hosts establish communication (i.e., enroll in a common group). In some cases, both the hosts may each have their own embedded device-specific certificate and associated private key. Moreover, the hosts may also each have an embedded certificate with a root Certificate Authority (CA) public verification key as well as that of the an intermediate CA key that is used to sign their device specific certificate. In some cases, the certificates may be assigned a validity period long enough to ensure that they, in effect, never expire. The hosts may also have access to a cryptographically strong PRNG. Similar to method 400, in some cases, method 500 may build upon a standard authenticated Diffie-Hellman style scheme that can prevent replay and MITM attacks. Moreover, notation similar to the notation used describing method 400, will be used to describe method 500.

In some cases, a client may be a member of a first communication group (hereinafter referred to as group 1) with Host i and a second communication group (hereinafter referred to as group 2) with Host j. In some instances, the client may send a signal, message, and/or an alert to either Host i, Host j, or both that the client is a member/enrolled in group 1 with Host i and a member/enrolled in group 2 with the Host j. In this example, at least Host j receives the signal from the client. In response, at step 502, Host j may sign a pairing request message (e.g., a host-to-host enrollment request message) with their private key and send the signed pairing request message $S_{RHj}${"Host Enroll"} and a Host j-certificate $R_{Hj}$ to Host i. Once Host i receives the pairing request message $S_{RHj}${"Host Enroll"} and the Host j-certificate $R_{Hj}$, at step 504, Host i may verify the signature on the Host j-certificate $R_{Hj}$. In some examples, Host i may verify the signature on the Host j-certificate $R_{Hj}$ using an intermediate CA verification key $R_H$. If the Host j-certificate $R_{Hj}$ is valid, Host i may then verify that the signature on the pairing request message $S_{RHj}${"Host Enroll"} is a valid signature. If the signature is valid, Host i may then generate a random value $x_i$. In some examples, Host i may use the random value $x_i$ to compute a blinded value $x_iG$. In this example, Host i may use their private key to sign the blinded value and send a Host i-certificate $R_{Hi}$ and the signed blinded value $S_{RHi}${"$x_iG$"} to Host j.

Once Host j receives the Host i-certificate $R_{Hi}$ and the signed blinded value $S_{Rcj}${"$x_iG$"}, at step 506, Host j may verify the signature on the Host i-certificate $R_{Hi}$. In some examples, Host j may verify the signature on the Host i-certificate $R_{Hi}$ using an intermediate CA verification key $R_H$. If the Host i-certificate $R_{Hi}$ is valid, Host j may then verify that the signature on the blinded value $S_{RHi}${"$x_iG$"} is valid. If the signature is valid, Host j may then generate a random value $y_j$. In some examples, Client j may use the random value $y_j$ to compute a blinded value $y_jG$. In this example, Host j may use their private key to sign the blinded value and send the signed blinded value $S_{Rcj}${"$y_jG$"} to Host i.

Once Host i receives the signed blinded value $S_{Rcj}${"$y_jG$"}, at step 508, Host i may verify that the signature on the blinded value $S_{Rcj}${"$y_jG$"} is valid. If the signature is valid, Host i may compute a shared Diffie-Hellman value $x_iy_jG$, derive a temporary key $K_{Tij}$=KDF($x_iy_jG$), and send a message including the shared value $x_iy_jG$, to Host j. In some cases, Host i may also generate one or more nonces $n_{ij1}$ and $n_{ij2}$ and retrieve a previously-generated group key $K_{Gi}$ and a key encryption key $K_{ki}$, for later key updates. Moreover, in some cases, Host i may encrypt nonces $n_{ij1}$ and $n_{ij2}$, the group key $K_{Gi}$, and the key encryption key $K_k$ using the temporary key $K_{Tij}$ and include the encrypted nonces $n_{ij1}$ and $n_{ij2}$, the group key $K_{Gi}$, and the key encryption key $K_{ki}$ in the message having the shared value $x_iy_jG$ (i.e., Host i may send $x_iy_jG$ E_$K_{Tij}$ {$K_{Gi}$,$K_{ki}$,$n_{ij1}$,$n_{ij2}$} to Host j).

Once Host j receives the message, at step 510, Host j may compute a shared value $y_jx_iG$. Host j may then compare the shared value $y_jx_iG$ to the shared value $x_iy_jG$. In some cases, if the shared values are equal ($y_jx_iG=x_iy_jG$), Host j may then derive the temporary key $K_{Tij}$ and use the temporary key $K_{Tij}$ to decrypt and extract the one or more nonces $n_{ij1}$ and $n_{ij2}$, the group key $K_{Gi}$, and the key encryption key $K_{ki}$ from the message. Host j may then verify that $m_{ij1}$=n'$_{ij1}$ and stores $K_{Gi}$ and $K_{ki}$. Host j may then retrieve its previously-generated group key $K_{Gj}$ and $K_{kj}$ and generate $E\_K_{Gi}\{n'_1,K_{Gj},K_{kj}\}$ and send it to Host i.

Once Host i receives $E\_K_{Gi}\{n'_1,K_{Gj},K_{kj}\}$, at step 512, Host i may decrypt $E\_K_{Gi}\{n'_1,K_{Gj},K_{kj}\}$ to recover $n''_i$. In some examples, Host i may then determine whether $n_i=n''_i$, to verify that Host j received the group key $K_{Gi}$ correctly. If $n_i=n''_i$ and Host j received the group key $K_{Gi}$ correctly, Host i may then compute $E\_K_{Gj}\{ACK,n_{ij2}\}$, where ACK may be some system-fixed acknowledgement message. Host i may then send $E\_K_{Gj}\{ACK,n_{ij2}\}$ to Host j to signal that Host i has completed the key exchange. Once Host j receives $E\_K_{Gj}\{ACK,n_{ij2}\}$, Host j may decrypt the $E\_K_{Gj}\{ACK,n_{ij2}\}$, extract $n''_{ij2}$, and verify that it $n''_{ij2}$ is equal to the value $n'_{ij2}$, extracted at step 510, to verify the successful completion of the key exchange. Method 500 may then end and Host i and Host j may use the group keys $K_{Gi}$ and $K_{Gj}$ for host-to-host group communications. For instance, as stated above, Host i and Host j may be configured into a CCM mode to enable cryptographic messaging and communication. AES-CCM may be a recommended cipher/mode as it is supported by the dedicated encryption hardware and it allows for the authentication of data alongside the encryption of sensitive data. However, this is not necessary and the Host i and Host j may be configured into several different ciphers/modes to facilitate cryptographic messaging and communication. In some examples, using method 500, an adversary without a valid signed certificate and associated private signing key cannot generate a valid signature in many of the exchanged messages, thus ending method 500 without an exchange of keys. Furthermore, as fresh keys and nonces are used with each host, replay attacks may be thwarted. Additionally, in some cases, rather than establishing a new, separate key for host-to-host communications, method 500 may allow the hosts to take advantage of the sync/more messages for their communication by enrolling with the other hosts in their group in a manner nearly identical to host-client enrollment method 400. In this scenario, hosts, alerted to the presence of other hosts connected to shared multi-system/multi-group clients, may initiate the enrollment process, at the end of which, they have learned the group keys of all the other hosts to which they are connected by a multi-system/multi-group client. They then can use these keys to listen in on the sync messages of the other hosts, effectively replicating the proposed host-to-host messaging.

In some cases, each host/distinguished host pairing, depicted in method 500, may require six rounds of communication with likely eight message frames required to carry the data. Total message size may be approximately 264 bytes for $H_i$ (280 if performing scheduled key update) and 338 bytes for $H_j$, with largest message size of approximately 200 bytes for each. Note that these sizes may go up if encoding or formatting required.

In some cases, method 500 may require $H_i$ to create two signatures, verify three signatures, compute two elliptic curve point multiplications, generate approximately 46 random bytes not counting random bits used in signature generation (an additional 36 bytes per signature), run the key derivation function to generate one AES key, and do two AES encryptions and one AES decryption on a total of four blocks (five if performing scheduled key update). $H_j$ may be required to create three signatures, verify two signatures, compute two additional elliptic curve point multiplications, generate approximately 30 random bytes not counting those for signature generation, run the key derivation function to generate one AES key, and do one AES encryption and two AES decryptions.

Figure 6:
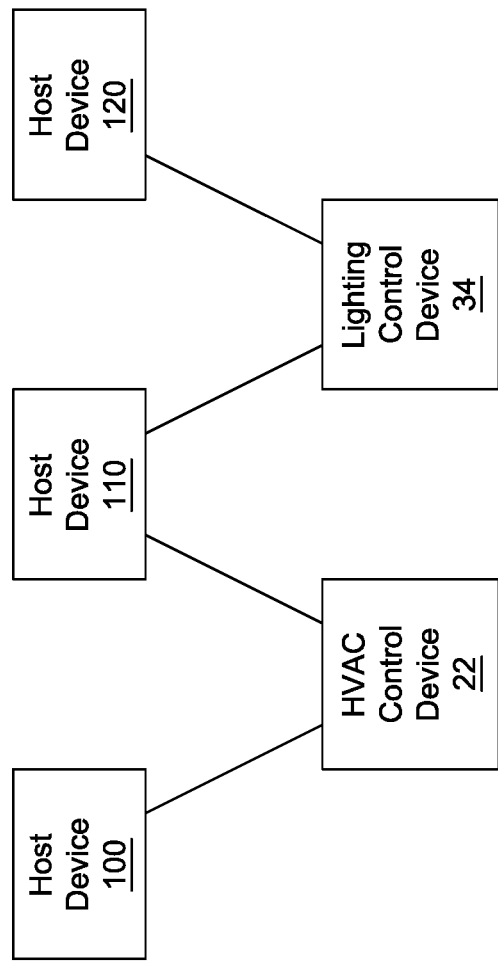
FIG. 6 depicts an example of hosts being separated across multiple clients.

FIG. 6 depicts an example of hosts being separated across multiple clients. In some cases, some pairs of hosts may be a part of a group, but are not connected to each other via a single client. As seen in FIG. 6, the host device 100 and a host device 120 may be separated across two clients (e.g., the HVAC control device 22 and the lighting control device 34). In such a case, using the host-to-host communication establishment application and method described in FIGS. 3 and 5, the host device 120 may only be enrolled with the host device 110, and not the host device 100. As such, the host device 120 may not be capable of decrypting messages from the host device 100. Accordingly, host-to-host communication may be broken between the host device 100 and the host device 120. However, according to various embodiments, the host device 100 and/or the host device 120 may hear repeat messages from other hosts that they are enrolled in a communication group with (e.g., the host device 110 repeats messages from the host devices 100 and 120). As such, the host device 100 and/or the host device 120 may be able to be decrypt the repeat messages from the host device 110, allowing the information/messages to spread throughout the entire group.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Also, in the above description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description as examples or embodiments, with each claim standing on its own as a separate embodiment, and it is contemplated that such embodiments can be combined with one another in various combinations or permutations.

What is claimed is:

1. A method for a host to establish communication with a client, the method comprising:
   receiving a pairing request message from the client;
   sending a host-specific certificate and a first value to the client;
   receiving a second value from the client in response to sending the host-specific certificate and the first value;
   deriving a temporary key in response to the second value being valid;

encrypting, using the temporary key, a group key, and a key encryption key for updating the group key;

sending a third value, the encrypted group key, and the encrypted key encryption key, to the client in response to the second value being valid;

receiving an encrypted fourth value from the client;

decrypting the fourth value using the updated group key; and sending a verification message to the client indicating successful establishment of communication in response to identifying that the client received the group key correctly.

2. The method of claim 1, further comprising:
generating the first value in response to a signature on the pairing request message being valid; and
signing the first value with a private key.

3. The method of claim 1, further comprising:
encrypting a first and second nonce using the temporary key; and
sending the encrypted first and second nonce to the client.

4. The method of claim 3, further comprising generating the group key for a current group period and the encryption key for updating the group key.

5. The method of claim 1, further comprising:
determining the fourth value equals the third value; and
identifying that the client received the group key correctly based on the fourth value equaling the third value,
wherein the verification message includes at least one nonce to verify that the verification message is valid.

6. The method of claim 1, further comprising using the updated group key to communicate with the client.

7. The method of claim 1, wherein sending the host-specific certificate and the first value to the client comprises sending a blinded value to the client.

8. The method of claim 1, wherein receiving the second value from the client comprises receiving a blinded value based on a random value.

9. A controller for establishing communication with a plurality of clients, the controller comprising:
a memory; and
processing circuitry operatively coupled to the memory and configured to:
receive a pairing request message from the client;
send a host-specific certificate and a first value to the client;
receive a second value from the client in response to sending the host-specific certificate and the first value;
derive a temporary key in response to the second value being valid;
encrypt, using the temporary key, a group key and a key encryption key;
send a third value, the encrypted group key, and the encrypted key encryption key, to the client in response to the second value being valid;
receive an encrypted fourth value from the client;
decrypt the fourth value using an updated group key; and
send a verification message to the client indicating successful establishment of communication in response to identifying that the client received the group key correctly.

10. The controller of claim 9, wherein the processing circuitry is further configured to:
generate the first value in response to a signature on the pairing request message being valid; and
sign the first value with a private key.

11. The controller of claim 10, further configured to:
encrypt a first and second nonce, using the temporary key; and
send the encrypted first and second nonce to the client.

12. The controller of claim 11, further configured to generate the group key for a current group period and the encryption key for updating the group key.

13. The controller of claim 9, wherein the processing circuitry is further configured to:
determine the fourth value equals the third value; and
identify that the client received the group key correctly based on the fourth value equaling the third value,
wherein the verification message includes at least one nonce to verify that the verification message is valid.

14. The controller of claim 9, wherein the processing circuitry is further configured to use the group key to communicate with the client.

15. The controller of claim 9, wherein to send the host-specific certificate and the first value to the client, the processing circuitry configured to send a blinded value to the client.

16. The controller of claim 9, wherein to receive the second value from the client, the processing circuitry configured to receive a blinded value based on a random value.

17. A host device for establishing communication with a plurality of clients, the host device comprising:
a memory; and
processing circuitry operatively coupled to the memory and configured to:
send a first blinded value to a client of the plurality of clients;
receive a second blinded value from the client;
compute a shared value based on the first blinded value and the second blinded value;
derive a temporary key based on the shared value;
encrypt, using the temporary key, a group key and a key encryption key for updating the group key;
send the encrypted group key and the encrypted key encryption key to the client;
after sending the encrypted group key and the encrypted key encryption key to the client, receive an encrypted message from the client;
decrypt the message using the updated group key; and
send a verification message to the client indicating successful establishment of communication in response to identifying that the client received the group key correctly.

18. The host device of claim 17, wherein the processing circuitry is configured to generate the first blinded value based on a random value.

* * * * *